Aug. 15, 1967    W. REIL ET AL    3,335,540
METHOD AND APPARATUS FOR MAKING CONTAINERS
Filed March 23, 1964    10 Sheets-Sheet 6
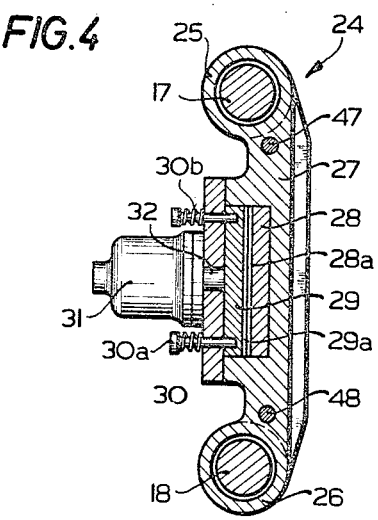
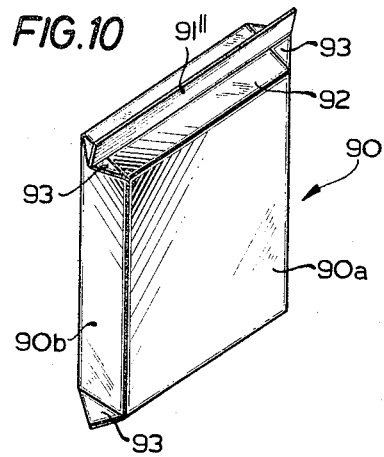
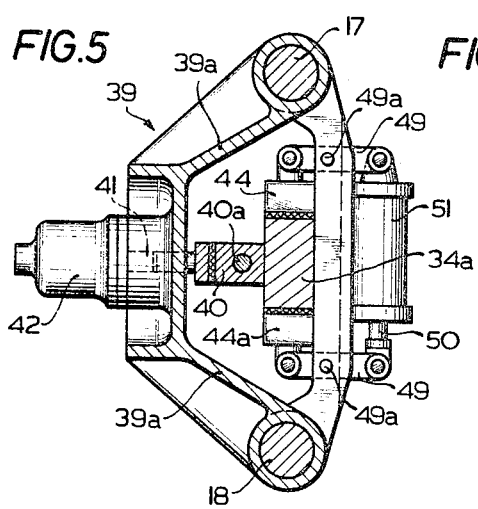
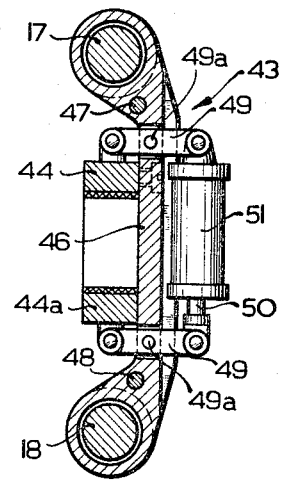
INVENTORS
Wilhelm Reil and
Werner Schwarzwälder
by Michael S. Striker
Attorney

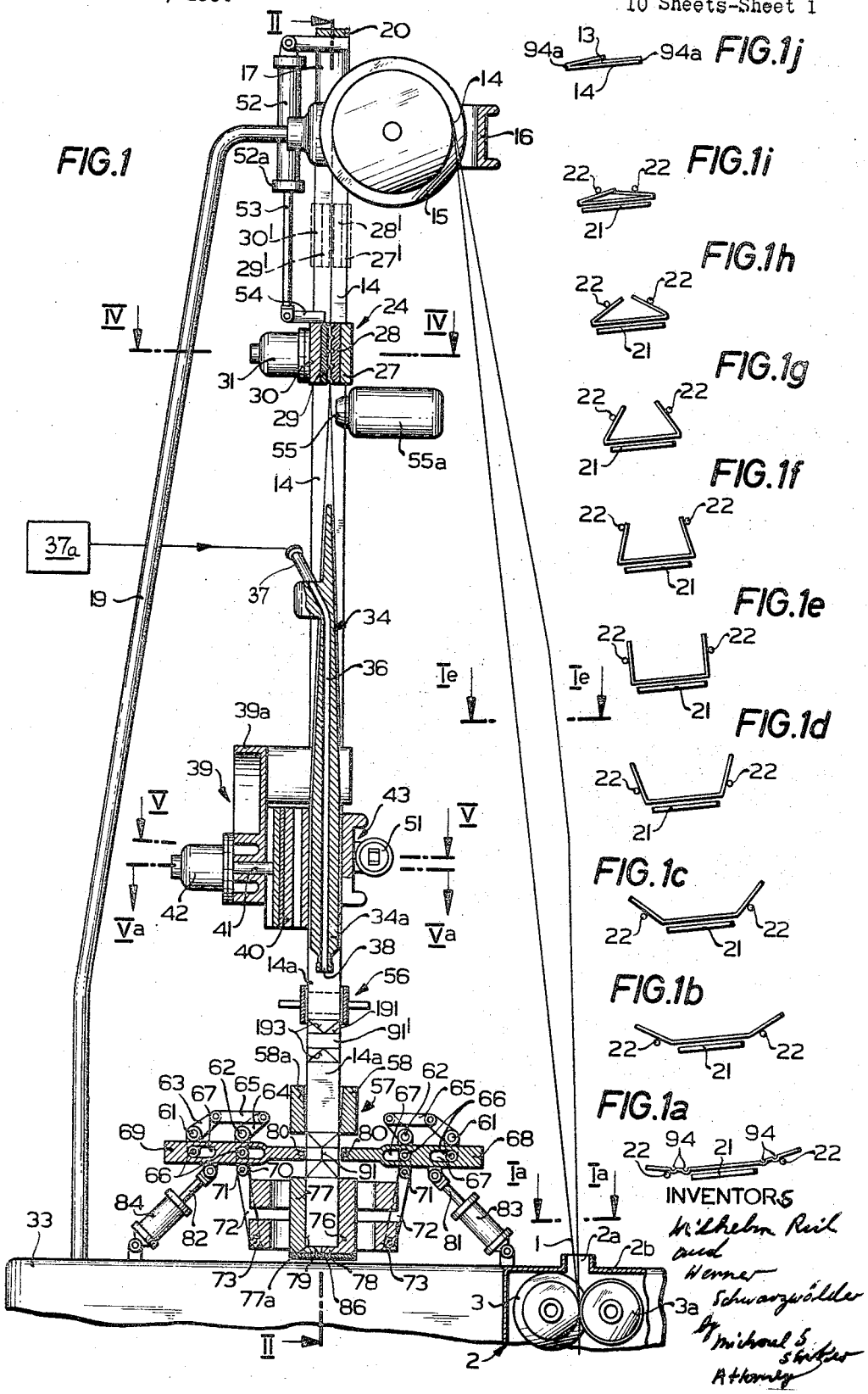

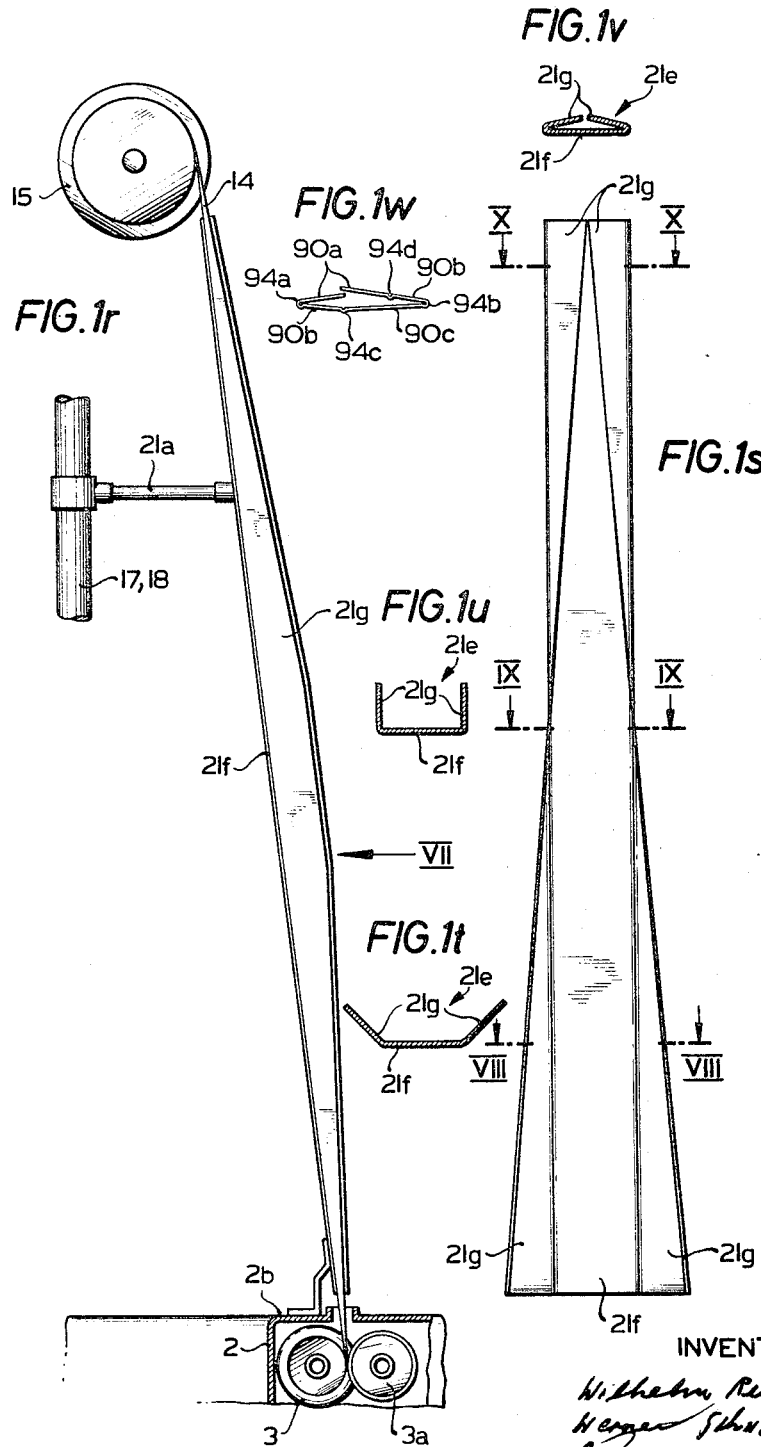

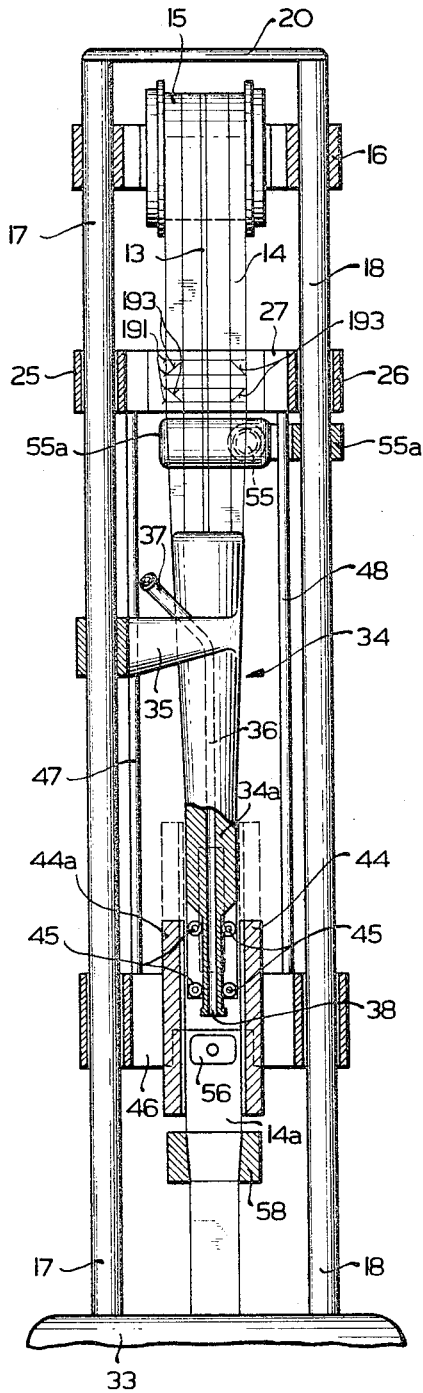

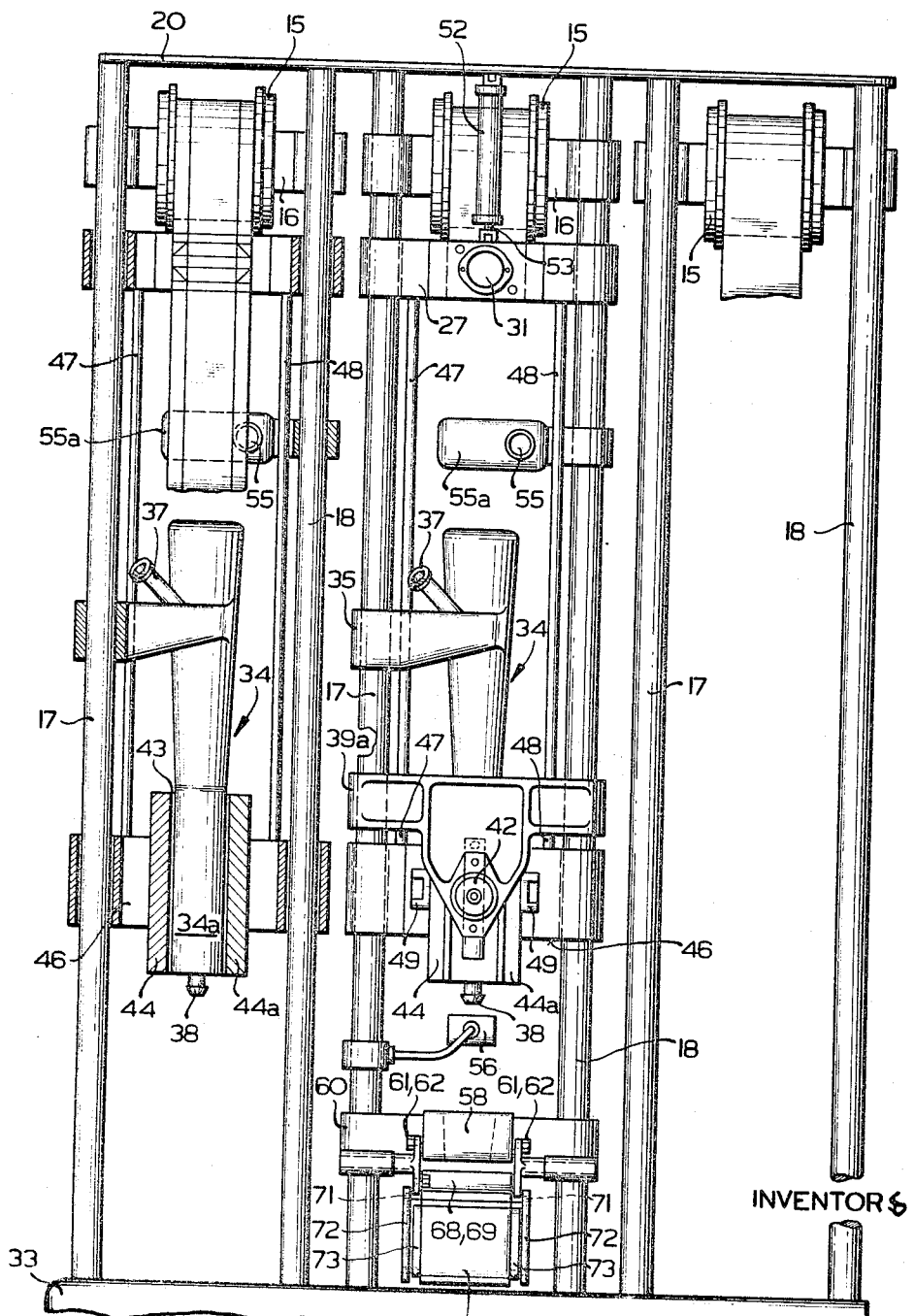

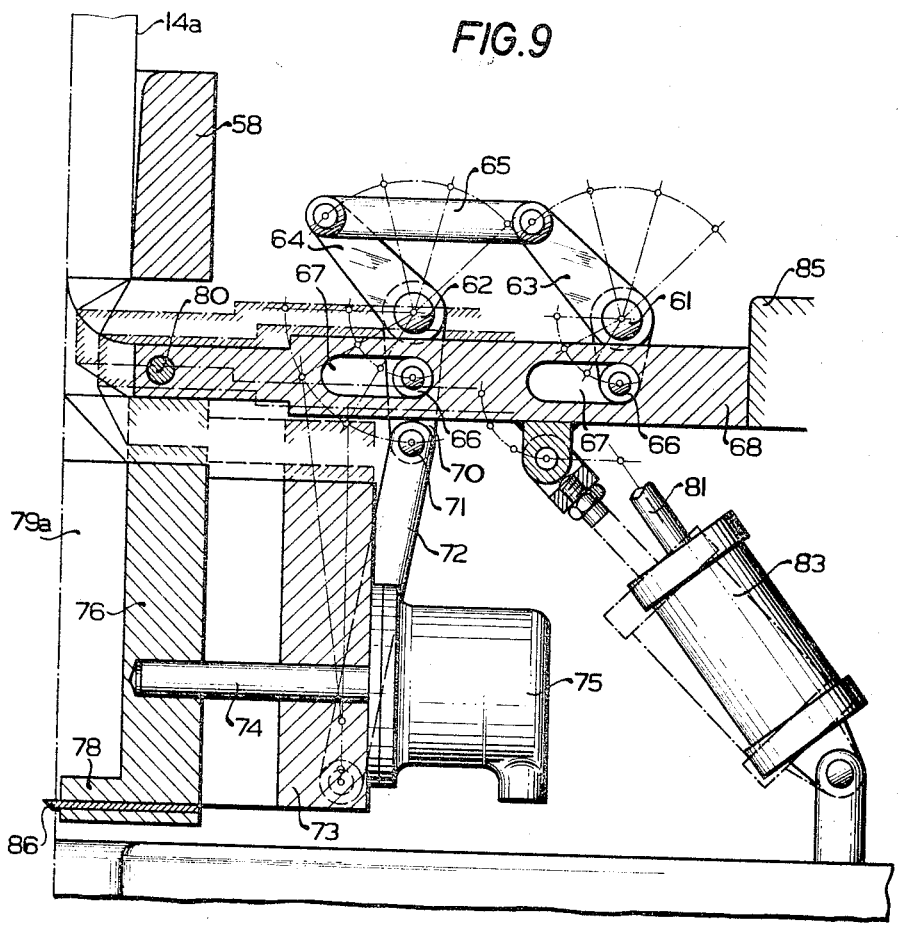

Aug. 15, 1967  W. REIL ET AL  3,335,540
METHOD AND APPARATUS FOR MAKING CONTAINERS
Filed March 23, 1964  10 Sheets-Sheet 10
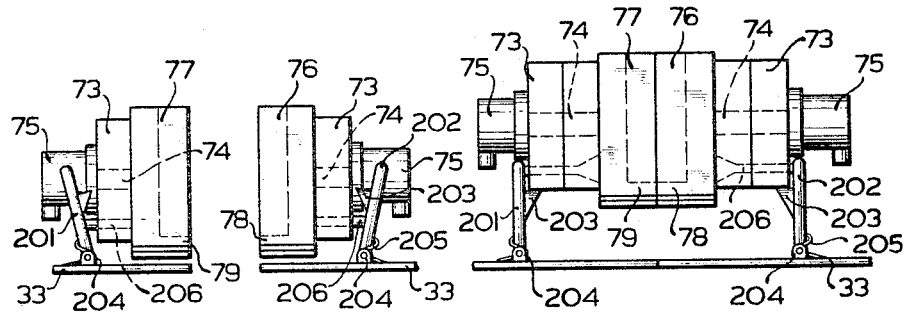
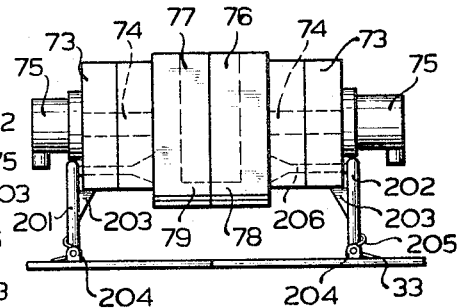
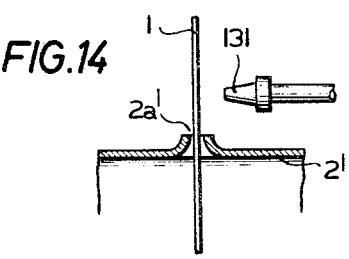
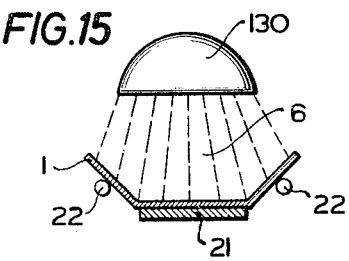
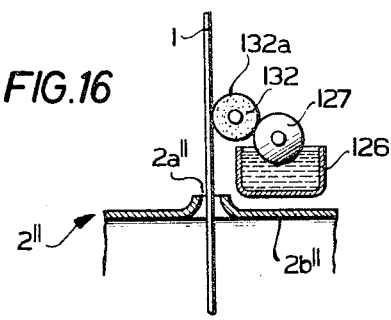
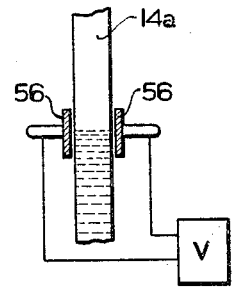

United States Patent Office
3,335,540
Patented Aug. 15, 1967

3,335,540
METHOD AND APPARATUS FOR MAKING CONTAINERS
Wilhelm Reil, Elmshausen uber Bensheim, Bergstrasse, and Werner Schwarzwälder, Wuppertal-Elberfeld, Germany, assignors to Habra-Werk Wilh. F. Ott, Darmstadt, Germany
Filed Mar. 23, 1964, Ser. No. 353,673
Claims priority, application Germany, Mar. 27, 1963, H 44,384, H 48,647
44 Claims. (Cl. 53—28)

The present invention relates to a method and apparatus for making containers, and more particularly to an improved method and apparatus for making, filling and sealing parallelepiped containers of paper or similar material.

It is an important object of this invention to provide a very simple method of making parallelepiped containers from webs of flexible material, such as plastic-coated paper or heat-sealable synthetic plastic, and of automatically filling and sealing such containers in a continuous operation.

It is another important object of the invention to provide a method of the just outlined characteristics according to which such parallelepiped containers may be formed, filled and sealed in rapid sequence.

A further object of the invention is to provide a method of the above outlined character according to which each consecutively formed parallelepiped container may receive exactly the same quantity of liquid, viscous or comminuted solid material.

An additional object of the invention is to provide a method of forming parallelepiped containers according to which the containers may be formed with truly rectangular walls including four side walls, a bottom end wall and a top end wall so that the containers may be readily stacked and stored in suitable boxes or similar receptacles.

A concomitant object of the invention is to provide a simple and inexpensive apparatus for the practice of the above method and to construct the apparatus in such a way that selected lengths of a continuous web of plastic-coated paper or heat-sealable synthetic plastic material may be automatically transformed into consecutive containers which are automatically filled with a liquid, pasty or comminuted solid material.

Still another object of the invention is to provide an apparatus of the just outlined characteristics wherein the web which is to form the containers is automatically sterilized prior to its transformation into containers and wherein such sterilizing or disinfecting action takes place at a point from which on the sterilized portion cannot come in contact with any parts which would be likely to destroy the sterilizing effect.

An additional object of the invention is to provide a mass-producing multi-stage apparatus wherein a plurality of bag producing, filling and sealing units may be assembled in close proximity to each other so that the entire apparatus constitutes a compact assembly which is capable of producing large quantities of properly shaped, filled and sealed bags or similar containers in a simultaneous operation.

A more specific object of the invention is to provide an improved sealing and deforming or shaping device which is capable of forming transversely extending flaps on a tube consisting of plastic-coated paper or synthetic thermoplastic material.

Still another object of the invention is to provide a novel mold which is combined with the just mentioned sealing device and is capable of properly deforming the top and bottom parts of two contiguous containers in a single operation.

With the above objects in view, one feature of our invention resides in the provision of a novel method of making, filling and sealing parallelepiped containers of heat-sealable web material. In one of its preferred forms, the method comprises the steps of intermittently advancing a continuous web and grooving the web lengthwise and across to form therein four longitudinal fold lines and longitudinally spaced groups of four transverse fold lines, intermittently folding the thus grooved web to form an unsealed tube wherein the marginal portions overlap, expanding the tube during intermittent advances of the web by leading the tube around a substantially vertical hollow filling mandrel of rectangular cross section to form at the leading end of the tube consecutive sections of rectangular outline having a longitudinal fold line at each corner and a group of transverse fold lines at each end thereof, heat-sealing the overlapping marginal portions of consecutive sections, heat-sealing the leading end of each consecutive section at a point beneath the mandrel by forming therein a transverse flap extending between the fold lines of the foremost group of transverse fold lines, admitting measured quantities of flowable (liquid, viscous or comminuted solid) material through the mandrel and into consecutive sections and consecutively advancing the foremost sections downwardly so that each measured quantity of such flowable material fills a section beneath the mandrel, heat-sealing the trailing ends of the thus filled consecutive sections at a point beneath the mandrel by forming therein transverse flaps which extend between the fold lines of the next-to-foremost group of transverse fold lines, consecutively deforming the thus obtained containers to provide each of their ends with a rectangular wall having two triangular gussets and bounded by two fold lines of the respective group of transverse fold lines, and severing the flap at the trailing end of each consecutive container to separate the same from the remainder of the web.

The longitudinal fold lines are formed in the web at a point which is preferably located ahead of the folding device. Subsequent to such longitudinal grooving, the web is preferably caused to travel past one or more sterilizing stations.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawings, in which:

FIG. 1 is a vertical section through a single stage apparatus which embodies one form of our invention;

FIGS. 1a to 1j illustrate the web and the folding device of the single-stage apparatus in ten different horizontal sectional views, the views of FIGS. 1a and 1e being taken respectively in the direction of arrows as seen from the lines Ia—Ia and Ie—Ie of FIG. 1;

FIG. 1r is a fragmentary view of FIG. 1 with another folding device of the web;

FIG. 1s is a view of the FIG. 1r in the direction of the line VII;

FIG. 1t is a horizontal section of the FIG. 1s in the direction of the line VIII—VIII;

FIG. 1u is a horizontal section of the FIG. 1s in the direction of the line IX—IX;

FIG. 1v is a horizontal section of the FIG. 1s in the direction of the line X—X;

FIG. 1w is a similar view to the FIG. 1j with another folding device;

FIG. 2 is another vertical section substantially as seen in the direction of the arrows from the line II—II of FIG. 1;

FIG. 3 is a similar vertical section through a multi-stage apparatus which comprises three apparatus of the type shown in FIG. 2;

FIG. 4 is an enlarged horizontal section through the transverse scoring or grooving device of the single-stage apparatus substantially as seen in the direction of arrows from the line IV—IV of FIG. 1;

FIG. 5 is an enlarged horizontal section substantially as seen in the direction of arrows from the line V—V of FIG. 1, and illustrates the lateral heat-sealing device of the single-stage apparatus which seals the marginal portions of the tube;

FIG. 5a is an enlarged horizontal section through a portion of a web-advancing device as seen in the direction of arrows from the line Va—Va of FIG. 1;

FIG. 9 is a fragmentary vertical section through the second heat-sealing device of FIGS. 6 to 8 and illustrates certain of its parts in a number of different positions;

FIG. 10 is a perspective view of a sealed parallelepiped container;

FIG. 12 illustrates a detail of the structure shown in FIG. 6, and more particularly the arresting device which serves to automatically retain the mold in its operative position;

FIG. 13 is a similar view and illustrates the arresting device in operative position;

FIG. 14 is a fragmentary vertical section through a different sterilizing unit which may replace the sterilizing unit of FIG. 11 and which utilizes a spray nozzle;

FIG. 15 is a schematic top plan view of another sterlizing unit which may replace the sterilizing unit of FIG. 11 or 14;

FIG. 16 is a fragmentary vertical section through a fourth sterilizing unit which utilizes a roller coated with a layer of sponge rubber or the like; and FIG. 17 is a schematic illustration of a device for measuring the quantity of liquid, viscous or comminuted solid material which is admitted into consecutive containers.

Figure 1P:
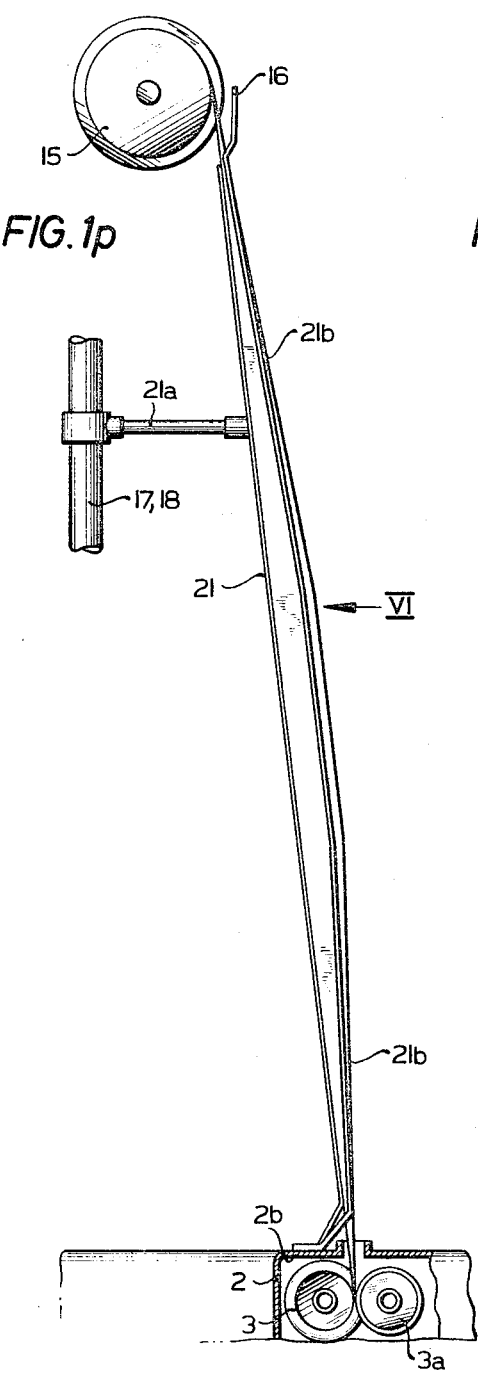
FIG. 1p is a fragmentary view of FIG. 1 with the folding devices of the web.

Referring to FIGS. 1 and 2, there is shown an elongated web 1 consisting of paper having one of its sides coated with a layer of heat-sealable thermoplastic material or consisting entirely of such heat-sealable material. A continuous length of this web is being fed intermittently from a supply reel (not shown) which is accommodated in the wheel-mounted housing of a carriage 2 located at a level below the remaining parts of the apparatus and supporting a pair of driven feed rollers 3, 3a having aligned projections and recesses to effect lengthwise grooving or scoring of the web before the web issues through a slot 2a provided in the top wall 2b of the carriage. The rollers 3, 3a constitute a longitudinal grooving or scoring device which provides the web with four longitudinally extending parallel fold lines 94 shown in FIG. 1a. Each of these fold lines 94 will be located at one (or both) corner of the parallelepiped container which is obtained upon suitable treatment of the web 1. It goes without saying that the feed rollers 3, 3a may be replaced by a different scoring or grooving device, for example, one utilizing fixed rails or similar instrumentalities of known design.

As a rule, the web 1 will be subjected to a disinfecting or sterilizing action prior to being folded into a tube, and the means for carrying out such sterilizing action may be constructed in a number of different ways. For example, FIG. 14 illustrates a modified carriage 2' having a housing provided with a slot 2a' through which the web 1 passes upwardly along the orifice or orifices of a spray nozzle 131 which discharges a spray of gaseous or liquid disinfectant to sterilize one side of the web, namely, that side which is to constitute the inner sides of finished containers.

FIG. 15 illustrates a modified sterilizing or disinfecting unit which includes a lamp 130 arranged to direct beams of ultraviolet rays against the inner side of the partially folded web 1. This lamp may be arranged somewhere between the folding stations of FIGS. 1a and 1g. Two or more such lamps may be used if desired.

FIG. 16 illustrates a further disinfecting or sterilizing unit which is located immediately above the top wall 2b'' of a carriage 2''. This sterilizing unit comprises a tank 126 accommodating a supply of sterilizing liquid, and a transfer roller 127 which dips into the container 126 to transfer a layer of liquid onto a pasting roller 132 which is in direct contact with one side of the web 1. The periphery of the pasting roller 132 is coated with sponge rubber 132a or similar soft liquid-accumulating material. The web 1 is led through a slot 2a'' in the top wall 2b''.

Referring to FIGS. 1a–1i, the folding device comprises an elongated folding rail 21 and a series of folding fingers 22 which cooperate with the rail 21 to transform the web 1 into a flat tube 14 which is shown in FIG. 1j. The folding rail 21 is adjacent to the outer side of the web and is located substantially midway between the marginal portions to serve as an abutment for the median portion of the web so that the marginal portions of the web may be folded inwardly by the fingers 22 which effect such folding gradually in a manner as illustrated consecutively in FIGS. 1a–1i, until the web finally takes the form of a flat tube 14 whereby the marginal portions of the thus obtained tube overlap each other, see FIG. 1j. Such overlapping marginal portions are indicated in FIG. 1j by the reference numeral 13. The thus folded but unsealed tube 14 is trained around a deflecting roll 15 which is mounted at the upper end of the apparatus shown in FIG. 1 and which is journalled in a cross-head 16 secured to a pair of upright frame members 17, 18 extending upwardly from a base plate 33. The upper ends of the uprights 17, 18 carry a horizontal cover plate 20 and this plate is connected to an elongated prop 19.

If desired, the folding device of FIGS. 1a–1j may be constructed in such a way that the web 1 is folded along two of the fold lines 94 or, alternatively, the rollers 3, 3a may provide the web with two additional fold lines 94a indicated in FIG. 1j. It will be noted that FIGS. 1a–1j are shown substantially at the levels at which the structures shown therein are actually mounted in the apparatus of FIG. 1 or 2, i.e., between the top wall 2b and the deflecting roll 15. Regardless of its construction, the sterlizing unit which is utilized in the apparatus of our invention is invariably mounted at a point ahead of the structure shown in FIG. 1h, i.e., at a point where the entire inner side of the tube 14 may be treated by a gaseous or liquid disinfectant or by rays emanating from the lamp 130.

The rail 21 and the fingers 22 need not touch that side of the web which is to form the inner sides of containers.

Figure 1Q:
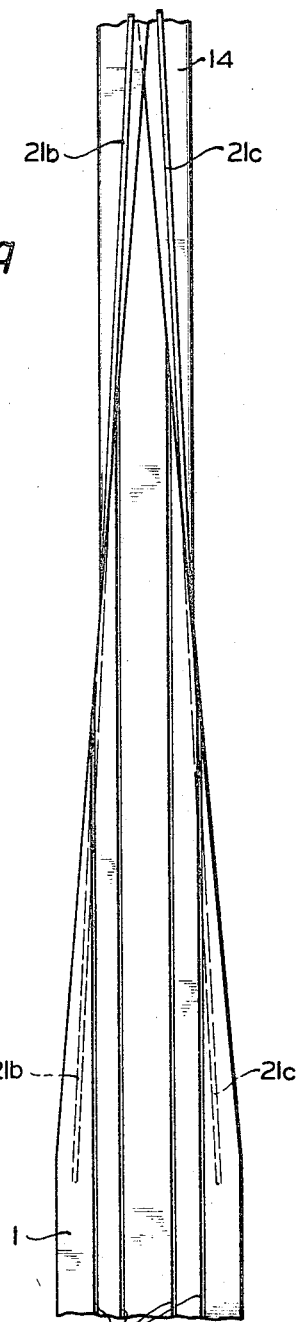
FIG. 1q is a view of the FIG. 1p in the direction of the line VI.
Figure 6:
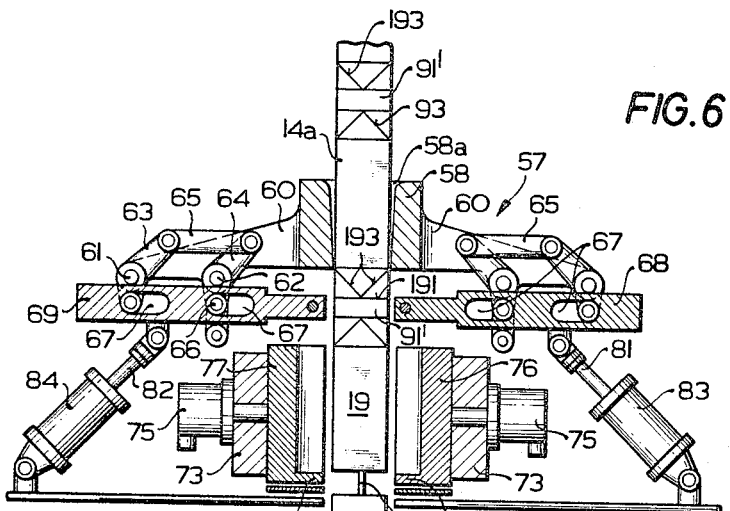
FIG. 6 is an enlarged vertical section through the lower part of the apparatus shown in FIG. 1, and illustrates the second heat-sealing device in one of its positions.

In FIG. 1p and 1q the guiding rail 21 is secured to the carrier 21a on the upright 17 or 18. The folding device comprises two guide rods 21b and 21c, which are fixed on the top wall 2b of the carriage 2. The guide rods 21b and 21c extend from the wall 2b to cross-head 16.

In FIG. 1r and 1s the folding device comprises a folding rail 21e which has at the beginning a width corresponding to the width of the web 1. The middle section 21f corresponding to the width of the flat tube 14. The outer sections 21g on both sides of section 21f are so formed, that the web 1 may be folded inwardly by the section 21g until the web finally takes the form of a flat tube 14 corresponding to FIG. 1t, 1u and 1v. The folding rail 21e is secured to the carrier 21a on the uuright 17 or 18.

If desired, the folding devices of FIG. 1w may be constructed in such a way that the tube 14 is folded along the fold lines 94a 94b, the third fold lines 94c is between 94a and 94b and the fourth fold lines 94d is folded over.

The roll 15 deflects the tube 14 vertically downwardly in such a way that the marginal portions 13 continue to overlap each other (i.e., without any undesirable lateral shifting of the web), and the still unsealed tube is then advanced first through a transverse scoring or grooving device 24 which is illustrated more clearly in FIG. 4. This transverse grooving device 24 provides longitudinally spaced portions of the tube 14 with transversely and/or nearly transversely extending groups of at least four transverse fold lines 191 for the purpose to be described later. In the grooving device 24 inclined lines 193, which will determine the configuration of the gussets 93, may be also scored or grooved (see also FIG. 2). Referring in more detail to FIG. 4, the grooving device 24 comprises a horizontal carrier 27 having two vertical sleeves 25, 26 which are respectively slidable along the uprights 17, 18. The carrier 27 supports a scoring or grooving plate 28 which is preferably rigidly mounted therein and one face 28a of which is provided with a series of substantially horizontal corrugations. This grooving plate 28 cooperates with a counter plate 29 which is reciprocable toward and away from the corrugated face 28a. The counterplate 29 is reciprocable with reference to a supporting plate 30 which is secured to the carrier 27 and which carries reciprocable bolts 30a secured to the counter plate 29 and biased by springs 30b to normally hold the counter plate at a short distance from the corrugated face 28a of the grooving plate 28. The counter plate 29 is connected to the free end of a piston rod 32 which is reciprocable in a pneumatic or hydraulic cylinder 31 and, when the cylinder receives a supply of compressed fluid, the piston rod 32 presses the counter plate 29 against the corrugated face 28a of the grooving plate 28 so as to effect transverse grooving or scoring of the tube 14. The right-hand face 29a of the counter plate 29 is formed with corrugations which are complementary to those on the face 28a so that, when the piston rod 32 performs a working stroke in a direction to the right, as viewed in FIG. 4, the corrugated faces 28a, 29a cooperate to provide groups of at least four transverse fold lines 191 at longitudinally spaced points of the unsealed tube 14, see FIG. 1.

The grooving device 24 is located at a level above a substantially vertical hollow filling mandrel 34, best shown in FIGS. 1 and 2. This mandrel tapers upwardy so that it may extend into the interior of the unsealed tube 14. The lower portion 34a of the mandrel 34 is of rectangular cross section which corresponds substantially to the cross sections of the containers to be formed in the apparatus of FIGS. 1 and 2. The mandrel is connected to a supporting arm 35 which is secured to the upright 17. Of course, the supporting arm 35 is connected to such portion of the mandrel which is located at a level where the tube 14 is still unsealed, see particularly FIG. 1. The mandrel 34 is formed with a longitudinally extending supply channel 36 which communicates with a supply pipe 37 leading to a source 37a of flowable liquid, viscous or comminuted solid material. If the material is a liquid, the source 37a of such liquid material may comprise a measuring pump which delivers accurately measured quantities of liquid at predetermined intervals and in synchronism with the operation of the remaining parts of the apparatus. If the material is a comminuted solid substance, such as a powder or a granular material, the pump is replaced by another suitable weighing or measuring device. At the lower end of its shaping or expanding portion 34a, the mandrel 34 is formed with a nozzle 38 which discharges flowable material directly into the interior of a freshly sealed section 14a of the tube 14.

The nozzle 38 is located below a lateral heat-sealing device 39 which bonds the overlapping marginal portions 13 of the tube 14 to each other so that a section 14a at the leading end of the tube forms a body of rectangular outline which is thereupon sealed at its leading (lower) end and which remains temporarily open at its trailing (upper) end so that it may receive a measured quantity of liquid or comminuted solid material. This lateral heat-sealing device 39 includes a carrier 39a which is slidable along the uprights 17, 18 in a manner best shown in FIG. 5. The carrier 39a supports a heated sealing plate 40 which is movable toward and away from the adjacent portion of the mandrel 34. The plate 40 is heatable by an electric heating element 40a of any known design. The means for reciprocating the sealing plate 40 toward and away from the shaping portion 34a of the mandrel 34 comprises a hydraulic or pneumatic cylinder 42 mounted on the carrier 39a and having a reciprocable piston rod 41 which is coupled to the sealing plate. The shaping portion 34a of the mandrel 34 serves as an anvil and supports the inner side of the tube 14 at the time the outer side of the tube is engaged by the sealing plate 40. The four fold lines 94 formed by the rollers 3, 3a are located at the four corners of the shaping portion 34a.

The carrier 39a is mounted substantially at the level of an advancing device 43 which serves to move the tube 14 intermittently through predetermined distances so that a requisite length of folded web material is advanced into the range of the sealing plate 40. The advancing device 43 comprises two advancing jaws 44, 44a which are adjacent to the outer side of the tube 14 and two pairs of counter rollers 45 which are mounted in the interior of the tube 14 and are supported by the nozzle 38, see particularly FIG. 2. The jaws 44, 44a are mounted on a transversely extending carrier 46 which is slidable along the uprights 17, 18 in the same way as the carrier 27. The carriers 27 and 46 are connected to each other by elongated coupling rods 47, 48 so that they always advance as a unit. The jaws 44, 44a are adjacent to the narrower sides of the tube 14 and each thereof is connected to one end of a link 49 which is pivoted to the carrier 46 by a vertical pin 49a, see particularly FIG. 5a. The other ends of the links 49 are connected to the piston rods 50 of a cylinder 51 which serves to rock the jaws 44, 44a toward and away from each other so that, when the jaws are moved toward each other, they clamp the tube 14 and press the inner side of the tube against the counter rollers 45.

The carriers 27, 46 are reciprocable in the longitudinal direction of the tube 14 by a means of a hydraulic or pneumatic cylinder 52 which is mounted at the upper end of the apparatus, see FIG. 1, and which comprises a downwardly extending piston rod 53 connected to a bracket 54 which is secured to the carrier 27 or to the supporting plate 30. The operation of the cylinders 51, 52 is timed in such a way that the cylinder 51 moves the jaws 44, 44a toward each other when the piston rod 53 is in the upper end position. In the next step, the valve which controls the admission of compressed fluid into the cylinder 52 is actuated in a sense that the cylinder 52 expels the piston rod 53 in downward direction while the jaws 44, 44a remain in clamping engagement with the tube 14. Consequently, the tube 14 is compelled to move downwardly through a distance which equals the length of a single container. FIGS. 1 and 2 illustrate the carriers 27, 46 in their lower end positions, and FIG. 3 illustrates these carriers in their upper end positions. FIG. 1 further shows (in phantom lines) the upper end position of each of the parts 27–30, and such parts are identified by primed numerals.

The system of valves which regulate the operation of the cylinders 51, 52 is controlled by a photoelectric cell 55 which is mounted on a fixed carrier 55a, see FIG. 1. This cell determines the exact length of strokes of the piston rod 53 to make sure that no web material is wasted when the tube is moved downwardly. The quantity of liquid or comminuted solid material which is admitted into the lower end portion 14a of the tube 14 is determined by a measuring device in the form of a condenser which is illustrated in FIG. 17. This condenser comprises two plates 56 located at the opposite sides of the section 14a, and its capacity is different when the section 14a contains a column of air or when this section is filled with a predetermined quantity of liquid or comminuted solid material. The collar 52a at the lower end of the cylinder 52 constitutes a fixed stop for the piston rod 53 and determines the end of the return (upward) stroke of the grooving device 24. The piston rod 53 is moved downwardly until a marking, which is printed on the tube 14 in a distance corresponding to the length of the single container, appears at the photoelectric cell 55, which gets an impulse. This photoelectric impulse is amplified and used for regulating the valve of the cylinder 52, which is closed. At this moment the moving down of the tube 14 is finished, to make sure that only the exact length of the tube is moved downwardly.

FIGS. 1, 6, 7, 8 and 9 illustrate a second heat-sealing device 57 which serves to seal consecutively formed containers 19 from each other and from the tube 14. This second sealing device comprises a vertically extending tubular guide 58 which is located beneath the condenser plates 56 and which defines a vertical passage 58a whose cross sectional area diminishes from the upper toward the lower end thereof so that the lowermost end of this passage equals the cross sectional area of a finished container 19. The sealing device 57 further comprises two substantially horizontal sealing jaws 68, 69 which are mounted in a manner best shown in FIGS. 6, 7, 8 and 9. The guide 58 is fixed and is provided with two laterally extending arms 60, see FIG. 6, each of which carries two horizontal pivots 61, 62 for bell crank levers 63, 64. The upper arms of the lever 63, 64 are connected by horizontal links 65 which insure that each lever is compelled to rotate through the same angle as the companion lever. The lower arms of the levers 63 carry follower rollers 66 which are received in horizontal slots 67 provided in the sealing jaws 68, 69. The lower arms 70 of the levers 64 may be provided with similar follower rollers 66 and the lowermost end of each arm 70 carries a connecting pin 71 which couples it to an elongated motion transmitting link 72. The lower ends of the links 72 are coupled to vertically reciprocable holders 73 and each of these holders carries one of two horizontally reciprocable mold sections 76, 77. The mold sections 76, 77 form an open-and-shut mold and define a mold cavity 77a, best shown in FIG. 8, which may receive a filled container 19 before such container is severed from the tube 14. Each of the mold sections 76, 77 carries at its lower end an inwardly extending horizontal compressing jaw 78, 79, and these jaws cooperate to deform the leading end of the freshly formed container 19 so that each container is formed with a rectangular bottom end wall.

The forward ends of the sealing jaws 68, 69 are provided with heating elements 80, which serve to heat these jaws to a temperature which is necessary to produce a heat sealing action on the material of the section 14a. The jaws 68, 69 are respectively coupled to the piston rods 81, 82 of two pneumatic sealing cylinders 83, 84 each of which is articulately supported by a stationary part of the apparatus, for example by the base plate 33. If desired, the heating elements 80 may be replaced by an impulse welding device of known design which is not shown in the drawings. The jaws 68, 69 effect transverse sealing of the leading end of the section 14a so that such section is formed with a transversely extending connecting flap 91 best shown in FIG. 1.

Figure 8:
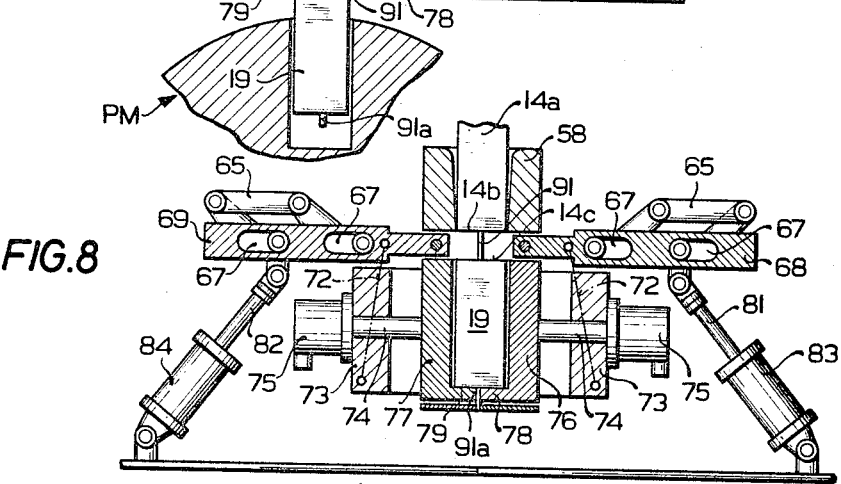
FIG. 8 illustrates the same heat-sealing device in the sectional view of FIGS. 6 or 7 but in a different position.
Figure 7:
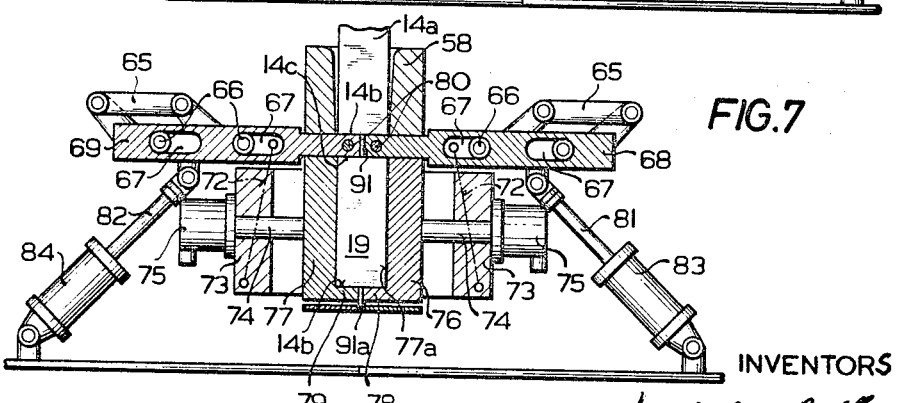
FIG. 7 is a similar vertical section through the second heat-sealing device and illustrates this device in a different position.

Referring to FIGS. 12 and 13, there is shown an arresting device which serves to temporarily retain the mold sections 76, 77 in their upper end positions at the time when the jaws 68, 69 are to move in sealing engagement with the section 14a. This arresting device comprises two upwardly extending retaining levers or arms 201, 202 which are articulately secured to the base plate 33 by horizontal pins 204 and each of which carries a pallet 203 extending toward the outer side of the respective holder 73. Each of the levers 201, 202 is biased by a spring 205 so that its pallet 203 normally abuts against the outer side of the respective holder 73. These holders are provided with horizontal bores for reciprocable bolts 206. FIGS. 7 and 8 illustrate the second sealing device 57 in a position corresponding to that of FIG. 13. The pallets 203 are located beneath the respective holders 73 so that the mold sections 78, 79 are retained in their upper end positions. The bolts 206 abut against the mold sections 76, 77. If the cylinders 75 thereupon retract the piston rods 74 so that the mold sections 76, 77 move away from each other toward the position of FIG. 6, the bolts 206 engage the levers 201, 202 and move the pallets 203 away from the undersides of the holders 73 so that the second sealing device 57 and the mold sections 76, 77 may descend to the position of FIG. 6.

The apparatus of FIGS. 1 to 9 operates as follows:

When the heat-sealing device of FIG. 5 has sealed the marginal portions 13 along a length of the tube 14 so as to form a longitudinally sealed section 14a, the advancing device including the piston rod 53 moves the thus sealed section 14a downwardly so that the leading lower end of this section extends between the jaws 68, 69. In the next step, the cylinders 75 move the piston rods 74 toward each other so as to close the mold and to move the compressing jaws 78, 79 into actual engagement with each other. The sealing cylinders 83, 84 thereupon shift the piston rods 81, 82 upwardly so as to move the sealing jaws 68, 69 toward each other. These sealing jaws perform a composite movement which is illustrated in FIG. 9 and which includes a translatory movement and a pivotal movement about the axes of the pivots 61, 62. As the jaws 68, 69 move toward each other, they rock the bell crank levers 63, 64 by shifting the follower rollers 66 so that the downwardly extending arms 70 of the bell crank levers 64 entrain the links 72 and lift the holders 73 together with the mold sections 76, 77. The holders 73 are lifted to such an extent that the pallets 203 of the levers 201, 203 may engage the undersides thereof whereby the holders 73 and the mold sections 76, 77 remain temporarily in the positions shown in FIG. 13.

When the tips of the sealing jaws 68, 69 are moved sufficiently close to each other, the heating devices 80 seal the leading end of the section 14a by forming a transverse flap 91. However, and as described above and as shown in FIG. 9, the jaws 68, 69 simultaneously perform an upward movement, namely, toward the underside of the guide 58 so that they actually move the freshly obtained flap 91 toward the underside of the guide. This means that the leading end of the section 14a is provided with a horizontal end wall of rectangular shape, this bottom end wall being identified in FIGS. 7 and 8 by a reference numeral 14b. At the same time, the jaws 68, 69 form two gussets 93 (see FIG. 10) which extend laterally from the thus obtained flap 91 and which are to be folded over the bottom end wall of the thus obtained container in an apparatus which is disclosed in our copending application Ser. No. 353,672, filed Mar. 23, 1964. The jaws 68, 69 are reciprocated between intermittent advances of the web.

Of course, as the sealing jaws 68, 69 move toward each other and upwardly toward the underside of the guide 53, the links 72 cause the mold sections 76, 77 to follow such upward movement and to press the top faces of the mold sections against the undersides of the sealing jaws 68, 69 in a manner as shown in FIG. 7. This means that the trailing end of a container 19 already accommodated in the mold cavity 77a is formed with a horizontal top end wall 14c of rectangular shape. This top end wall 14c is connected with the aforementioned flap 91. The flap 91a which is received between the jaws 78, 79 is thereupon severed by a horizontally reciprocable knife blade 86, best shown in FIG. 9, which is secured to the jaw 78 so that its cutting edge extends beyond the left hand end face of this jaw and may be received in a complementary recess provided in the jaw 79. The upper end positions of the jaws 68, 69 and 78, 79 are illustrated in FIG. 7. In such position of the jaws, a container 19 accommodated in the mold cavity 77a has been completely shaped in that it is formed with four vertical side walls of rectangular shape, with a rectangular bottom end wall 14b which is connected to the flap 91a, and with a rectangular top end wall 14c which is connected to the flap 91 securing it to the lower end of the section 14a.

When the formation of the flap 91 is completed, the heat-sealing device 57 is opened in the following manner: In the first step, the cylinders 83, 84 are caused to withdraw the piston rods 81, 82 so that the sealing jaws 68, 69 are moved away from each other and simultaneously descend to a lower level whereby the walls surrounding the slots 67 entrain the follower rollers 66 and rock the bell crank levers 63, 64 to the full-line positions of FIG. 9 in which the rear end faces of the sealing jaws 68, 69 abut against suitable fixed stops 85. In the next step the mold sections 76, 77 are moved apart by the piston rods 74 of the cylinders 75. The bolts 206 then move the levers 201, 202 away from the undersides of the holders 73 so that the pallets 203 may be disengaged from the holders and the mold sections 76, 77 may descend to the positions of FIG. 6.

The flowable material which is to fill the containers 19 is introduced subsequent to the formation of a flap 91, i.e., into the section 14a, so that such material fills a certain length of the section 14a which is accommodated in the interior of the guide 53. The condenser plates 56 determine the exact quantity of flowable material which is to be admitted into the section 14a. The admission of such flowable material into the section 14a is synchronized with the operation of the remaining devices and units in the apparatus of FIG. 1 so that such admission takes place at requisite intervals, namely, whenever the sealing jaws 68, 69 have completed the formation of a flap 91. The advancing device including the cylinder 52 and piston rod 53 then performs a forward stroke and advances the tube 14 downwardly through a distance corresponding to the length of a fresh container 19 and the flap 91 thereon. This means that the leading end of the section 14a which latter already contains a measured quantity of flowable material advances into the mold cavity 77a and is ready to be deformed into a parallelepiped container 19 which is shaped as soon as the sealing jaws 68, 69 move toward each other to form a new flap 91. When the apparatus of FIG. 1 is started, the first container which is accommodated in the mold cavity 77a is discarded because its lower end is open; however the next following container 19 is properly filled and sealed at both its ends and may be advanced into a packaging or stacking machine a portion of which is indicated at PM in FIG. 6. The apparatus thereupon continues to form consecutive containers 19 in the aforedescribed manner while the freshly formed containers which are separated from the remainder of the web by the knife blade 86 advance with a horizontal or rotary conveyor which is mounted in or beneath the base plate 33. The conveyor may advance the containers 19 to a further heat-sealing device which folds the gussets 93 against the top and bottom end walls of the containers and which heat-seals them to such walls so that the ultimate product is a parallelepiped container without any loose flaps and/or gussets. The flaps 91 are formed between the groups of transverse fold lines 191 and each of the end walls 14b, 14c is bounded by two such transverse fold lines. Thus, and referring to FIG. 1, the flaps 91 are formed in the zones marked 91' between the inner transverse fold lines 191 of a group. The inclined lines 193 will determine the configuration of gussets 93.

It goes without saying that the various hydraulic and pneumatic cylinders, piston rods, and other advancing, reciprocating and rotating elements of the apparatus shown in FIGS. 1 to 9 may be replaced by suitable mechanical or electrical devices of any known design. Such devices are not shown in the drawings, because a hydraulic, pneumatic or part hydraulic and part pneumatic system has been found to constitute a very satisfactory solution for actuating the movable parts of our apparatus.

FIG. 10 illustrates a container or bag 90 such as is discharged from the apparatus of FIG. 1 after being separated from the remainder of the web 1 by the horizontal knife blade 86. It will be noted that this container 90 comprises four vertical side walls including two wide side walls 90a and two narrow side walls 90b, a horizontal top end wall 92, a similar bottom end wall, an upper vertically extending transverse flap 91'' and a similar transverse flap which extends downwardly from its bottom end wall. The area of the flap 91'' equals one-half the area of a flap 91. Furthermore, the container 90 comprises four outwardly extending triangular gussets 93, which extend from the top and bottom end walls thereof. The gussets 93 may be folded against the side walls or against the bottom and top end walls of the container to be heat-sealed thereto so that the ultimate product is one of perfect parallelepiped shape. The same applies for the flaps 91'' which may be folded against the top and bottom end walls of the container. One suitable way of folding the flaps 91' and gussets 93 against the side, bottom and top end walls of the containers is described in U.S. Letters Patent No. 3,089,298 which is assigned to the same assignee.

Figure 11:
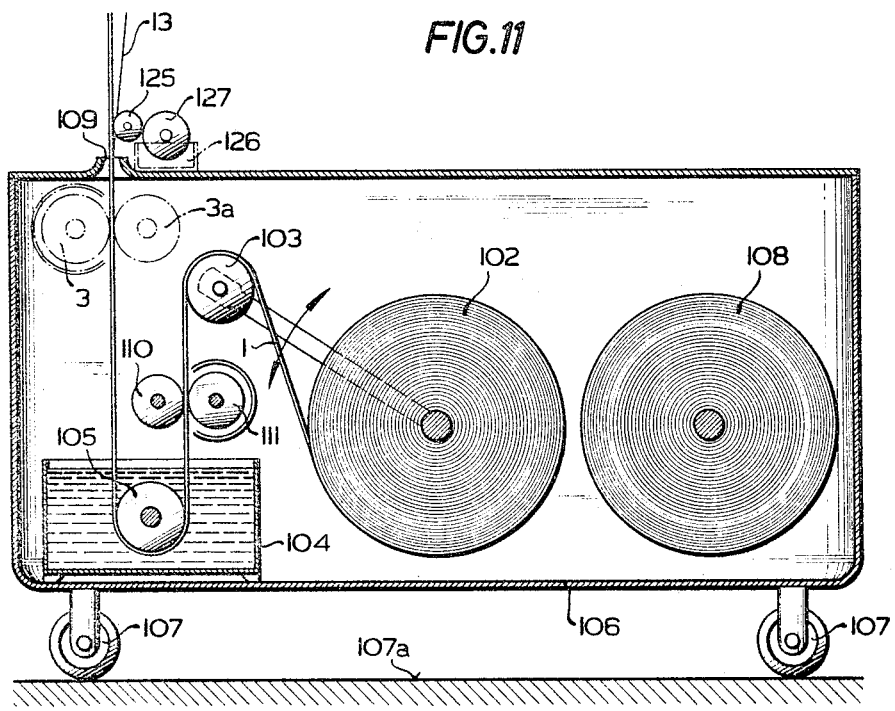
FIG. 11 is a vertical section through a sterilizing unit which may be utilized in the apparatus of FIG. 1.

FIG. 11 illustrates a mobile disinfecting or sterilizing unit which includes a carriage having a housing 106 accommodating a supply reel 102 which pays out the web 1. The housing 106 is mounted on wheels 107 which are arranged to travel along horizontal rails 107a disposed at a level below the base plate 33, not shown in FIG. 11. The web 1 which is being paid out by the reel 102 is guided around a deflecting roller 103 and thereupon around a wetting roller 105 which is mounted in liquid-filled tank 104 supported by the bottom wall of the housing 106. The liquid which fills the tank 104 is a disinfectant which may treat both sides of the web 1. The web thereupon advances upwardly and through a slot 109 to be led through a folding device which may be the same as the one described in connection with FIGS. 1a–1j. In the embodiment of FIG. 11, the feed rollers 3, 3a of FIG. 1 may be used with or as a substitute for a pair of feed rollers 110, 111 which are located upstream of the wetting roller 105, i.e., downstream of the deflecting roller 103. However, it is equally possible to use the rollers 110, 111 instead of rollers 3, 3a. For example, the rollers 3, 3a may serve to form one pair of fold lines 94 and the rollers 110, 111 then serve to form the other pair of fold lines 94 shown in FIG. 1a.

If necessary, the sterilizing unit of FIG. 11 may be used in combination with a second disinfecting or sterilizing unit which is illustrated somewhat schematically above the top wall of the housing 106. The second sterilizing unit comprises a source here shown as a tank 126 filled with a liquid disinfectant, a transfer roller 127 which transfers a layer of liquid disinfectant from the interior of the tank 126, and a roller-shaped applicator 125 which is in contact with one side of the web 1 at the time the web is still open, i.e., at the time when the marginal portions 13 are still spaced from each other.

A spare reel 108 of convoluted web material is shown in the right-hand portion of the chamber defined by the housing 106.

It is clear that each of the sterilizing units shown in FIG. 11 may be used alone or in combination with one of the units shown in FIGS. 14 and 15. If desired, the periphery of the applicator 125 may be coated with a layer of liquid-accumulating material such as the layer 132a of sponge rubber shown in FIG. 16.

If desired the second heat-sealing device 57 and the mold sections 76, 77 may be constructed in such a way that the gussets 93 are automatically tucked in above and below the respective end walls so that only the flaps extend beyond the walls of a finished container.

The multi-stage apparatus of FIG. 3 is an assembly including three apparatus of the type shown in FIGS. 1 and 2. The main difference is that the apparatus of FIG. 3 comprises a longer cover plate 20' which is connected with the upper ends of three pairs of uprights 17, 18 and a longer base plate 33' which is connected with the lower ends of these uprights. The rightmost stage of this multi-stage apparatus is represented solely by a deflecting roll 15 and the leftmost stage is shown without the second heat-sealing device 57 and without the mold.

Of course, the operation of all three stages may be synchronized so that a single source of flowable material may be connected to all three mandrels 34, that a single measuring device (including the condenser plates 56) will suffice for all three stages, that all carriers may reciprocate as a unit, that all such carriers (including the carriers 27, 39a, 46) may be reciprocated by a single advancing device, and that all of the sealing jaws may be connected with a single source of electrical energy.

The multi-stage apparatus of FIG. 3 may be modified to comprise only two or four or more apparatus of the type shown in FIG. 1.

Without further analysis, the foregoing will so fully reveal the gist of the present invention that others can, by applying current knowledge, readily adapt it for various applications without omitting features which fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A method of making, filling and sealing containers from heat-sealable web material, comprising the steps of intermittently advancing a continuous web and grooving the web lengthwise to form in the web a plurality of longitudinal fold lines; intermittently folding the thus grooved web to form an unsealed tube wherein the marginal portions overlap and which is composed of elongated strip-shaped portions folded upon each other; grooving the thus formed unsealed tube crosswise to provide such tube with groups of transverse fold lines; expanding said lengthwise and crosswise grooved tube during intermittent advances of the web to form consecutive sections of polygonal outline having a longitudinal fold line at each corner and a group of transverse fold lines at each end thereof; heat-sealing the marginal portions of consecutive sections; heat-sealing the leading ends of consecutive sections to form transverse connecting flaps extending between the fold lines of consecutive groups of transverse fold lines; admitting flowable material through the unsealed tube and into consecutive sections so that admissions of such flowable material alternate with the formation of consecutive flaps whereby each consecutive section forms a container accommodating a quantity of flowable material; deforming the ends of consecutive containers so that each thereof comprises a pair of polygonal end walls respectively bounded by fold lines of a first group and by fold lines of the next-following group of transverse fold lines; and cutting across consecutive flaps to separate the foremost containers from the remainder of the web.

2. A method of making, filling and sealing parallelepiped containers from heat-sealable web material, comprising the steps of intermittently advancing a continuous web and grooving the web lengthwise to form in the web four longitudinal fold lines; sterilizing at least that side of the thus grooved web which is to constitute the inner sides of containers; intermittently folding the thus sterilized web to form an unsealed tube wherein the marginal portions overlap and which is composed of elongated strip-shaped portions folded upon each other; grooving the unsealed tube crosswise to provide such tube with longitudinally spaced groups of transverse fold lines; expanding said lengthwise and crosswise grooved tube during intermittent advances of the web to form consecutive sections of rectangular outline having a longitudinal fold line at each corner and a group of transverse fold lines at each end thereof; heat-sealing the marginal portions of consecutive sections; heat-sealing the leading ends of consecutive sections to form transverse connecting flaps extending between the fold lines of consecutive groups of transverse fold lines; admitting measured quantities of flowable material through the unsealed tube and into consecutive sections so that admissions of such flowable material alternate with the formation of consecutive flaps whereby each consecutive section forms a container accommodating a measured quantity of flowable material; deforming the ends of consecutive containers so that each thereof comprises a pair of rectangular end walls respectively bounded by two fold lines of a first group and by two fold lines of the next-following group of transverse fold lines and each provided with two triangular gussets; and cutting across consecutive flaps to separate the foremost containers from the remainder of the web.

3. In a method of making, filling and sealing parallelepiped containers of heat-sealable web material, the steps of forming the web material into a tube about a substantially vertical hollow filling mandrel of rectangular cross section; forming a transverse seal across the tube to close the lower end thereof beneath the mandrel; admitting a measured quantity of flowable material into the tube by conveying such material through the mandrel and moving a section of the tube downwardly through a distance corresponding to the length of a container so that such measured quantity of flowable material fills the tube beneath the mandrel; forming a second transverse seal across the tube to close said section at the upper end thereof beneath the mandrel; deforming the upper and lower ends of the thus sealed section by moving the sealed section upwardly to form a parallelepiped container with rectangular top and bottom end walls; and severing the tube across the second seal to separate the container from the remainder of the tube.

4. In a method as set forth in claim 3, the additional steps of groving the web lengthwise, sterilizing the thus grooved web by directing ultraviolet rays against that side of the web which is to constitute the inner side of a container, and grooving the tube crosswise upstream of the mandrel.

5. In a method as set forth in claim 3, the additional steps of grooving the web lengthwise, sterilizing the thus grooved web by conveying the web through a bath of sterilizing liquid and grooving the tube crosswise upstream of the mandrel.

6. In a method as set forth in claim 3, the additional steps of grooving the web lengthwise, sterilizing the thus grooved web by directing sprays of sterilizing liquid against that side of the web which is to constitute the inner sides of the containers, and grooving the tube crosswise upstream of the mandrel.

7. In a method as set forth in claim 3, the additional steps of grooving the web lengthwise, sterilizing the thus grooved web by coating with a layer of sterilizing liquid at least that side of the web which is to constitute the inner sides of containers, and grooving the tube crosswise upstream of the mandrel.

8. An apparatus for making, filling and sealing containers from heat-sealable web material, comprising advancing means for intermittently advancing a continuous web lengthwise; folding means adjacent to the path of the web and arranged to overlay the marginal portions of the web so that the web forms a tube; a hollow filling mandrel extending into said tube and having a shaping portion of polygonal outline so that the tube follows such outline; first heat-sealing means for sealing the marginal portions of such sections of the tube which advance intermittently along and beyond said mandrel; second heat-sealing means located past said mandrel and arranged to provide the leading ends of consecutively sealed sections with traverse flaps so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable material through said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls.

9. An apparatus for making, filling and sealing containers from heat-sealable web material, comprising advancing means for intermittently advancing a continuous web lengthwise; folding means adjacent to the path of the web and arranged to overlap the marginal portions of the web so that the web forms a tube; a hollow filling mandrel extending into said tube and having a shaping portion of polygonal outline so that the tube follows such outline; first heat-sealing means for sealing the marginal portions of such sections of the tube which advance intermittently along and beyond said mandrel; second heat-sealing means located past said mandrel and arranged to provide the leading ends of consecutively sealed sections with transverse flaps so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable material through said mandrel so that each section receives such material prior to the formation of a flap at the trailing end thereof; deforming means comprising an open-and-shut mold located past and cooperating with said second heat-sealing means to simultaneously deform the trailing end of a container received therein and the leading end of the nearest section and to thereby provide such containers and sections with polygonal end walls; and knife means arranged to sever the flaps at the leading ends of containers in said mold so that the remainder of the web is separated from consecutive containers which advance beyond said mold.

10. An apparatus for making, filling and sealing containers from heat-sealable web material, comprising advancing means for intermittently advancing a continuous web lengthwise; grooving means adjacent to the path of the web and arranged to provide the web with a plurality of longitudinal fold lines; folding means adjacent to the path of the thus grooved web and arranged to overlap the marginal portions of the web so that the web forms a tube; a hollow filling mandrel extending into said tube and having a shaping portion of polygonal outline so that the tube follows such outline and that one of said fold lines is located at each corner thereof; first heat-sealing means for sealing the marginal portions of such sections of the tube which advance intermittently along and beyond said mandrel; second heat-sealing means located past said mandrel and arranged to provide the leading ends of consecutively sealed sections with transverse flaps so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable material through said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls.

11. An apparatus for making, filling and sealing containers from heat-sealable web material, comprising advancing means for intermittently advancing a continuous web lengthwise; deflecting means adjacent to the path of the web and arranged to guide the web first upwardly and thereupon substantially vertically downwardly; folding means adjacent to the path of the web ahead of said deflecting means and arranged to overlap the marginal portions of the web so that the web forms a tube; a substantially vertical hollow filling mandrel extending into said tube at a point past said deflecting means and having a shaping portion of polygonal outline so that the tube follows such outline; first heat-sealing means for sealing the marginal portions of such sections of the tube which advance intermittently along and beyond said mandrel; second heat-sealing means located past said mandrel and arranged to provide the leading ends of consecutively sealed sections with transverse flaps so as to simultaneously close the adjacent ends of two consecutive sections whereby the foremost section forms a sealed container; means to impart to said second heat-sealing means an inward motion against the leading ends of consecutively sealed sections and an upward motion; measuring means for admitting into consecutive sections measured quantities of flowable material through said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls.

12. An apparatus for making, filling and sealing containers from heat-sealable web material, comprising advancing means for intermittently advancing a continuous web lengthwise; folding means adjacent to the path of the web and arranged to overlap the marginal portions of the web so that the web forms a tube; a transverse grooving device arranged to provide said web with groups of longitudinally spaced transverse fold lines; a hollow filling mandrel extending into said tube and having a shaping portion of polygonal outline so that the tube follows such outline; first heat-sealing means for sealing the marginal portions of such sections of the tube which advance intermittently along and beyond said mandrel; second heat-sealing means located past said mandrel and arranged to provide the leading ends of consecutively sealed sections with transverse flaps intermediate the fold lines of consecutive groups of transverse fold lines so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable material through said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls each bounded by fold lines of the respective group of transverse fold lines.

13. An apparatus for making, filling and sealing containers from heat-sealable web material, comprising advancing means for intermittently advancing a continuous web lengthwise; folding means adjacent to the path of the web and arranged to overlap the marginal portions of the web so that the web forms a tube; a hollow filling mandrel extending into said tube and having a shaping portion of polygonal outline so that the tube follows such outline; first heat-sealing means for sealing the marginal portions of such sections of the tube which advance intermittently along and beyond said mandrel, said advancing means comprising a plurality of advancing jaws recipocable into and out of engagement with that portion of the tube which surrounds said mandrel, means for reciprocating said jaws toward and away from said mandrel, and means for reciprocating said jaws in the longitudinal direction of the tube; second heat-sealing means located past said mandrel and arranged to provide the leading ends of consecutively sealed sections with transverse flaps so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable material through said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls.

14. An apparatus as set forth in claim 13, wherein said advancing means further comprises counter rollers provided on said mandrel and cooperating with said jaws to clamp the tube when the jaws are moved toward the mandrel and thereupon in the longitudinal direction of the tube.

15. An apparatus for making, filling and sealing parallelepiped containers from heat-sealable web material, comprising advancing means for intermittently advancing a continuous web lengthwise; folding means adjacent to the path of the web and arranged to overlap the marginal portions of the web so that the web forms a tube; a hollow filling mandrel extending into said tube and having a shaping portion of rectangular outline so that the tube follows such outline; first heat-sealing means for sealing the marginal portions of such sections of the tube which advance intermittently along and beyond said mandrel; second heat-sealing means located past said mandrel and arranged to provide the leading ends of consecutively sealed sections with transverse flaps so as to simultaneously close the adjacent ends of two consecutive sections whereby the foremost section forms a sealed container of rectangular cross section; means to impart to said second heat-sealing means an inward motion against the leading ends of consecutively sealed sections and a motion in a direction counter to the direction of intermittent advance of said sections; measuring means for admitting into consecutive sections measured quantities of flowable material through said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with rectangular end walls.

16. An apparauts for making, filling and sealing containers from heat-sealable web material, comprising advancing means for intermittently advancing a continuous web lengthwise; folding means adjacent to the path of the web and arranged to overlap the marginal portions of the web so that the web forms a tube; a transverse grooving device for providing said tube with groups of longitudinally spaced transverse fold lines, said advancing means being arranged to reciprocate said grooving device longitudinally of the tube so that said fold lines are formed during intermittent advances of the web; a hollow filling mandrel extending into said tube and having a shaping portion of polygonal outline so that the tube follows such outline; first heat-sealing means for sealing the marginal portions of such sections of the tube which advance intermittently along and beyond said mandrel; second heat-sealing means located past said mandrel and arranged to provide the leading ends of consecutively sealed sections with transverse flaps intermediate the fold lines of consecutive groups of transverse fold lines so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable material through said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls each bounded by fold lines of the respective group of transverse fold lines.

17. An apparatus as set forth in claim 16, wherein said transverse grooving device comprises a grooving plate having a corrugated face located at one side of the tube, a counter plate having a corrugated face located at the opposite side of the tube, and means for reciprocating one of said plates toward and away from the other plate.

18. An apparatus as set forth in claim 17, wherein the means for reciprocating said one plate comprises a fluid-operated cylinder having a reciprocable piston rod coupled to said one plate.

19. An apparatus for making, filling and sealing containers from heat-sealable web material, comprising advancing means for intermittently advancing a continuous web lengthwise; folding means adjacent to the path of the web and arranged to overlap the marginal portions of the web so that the web forms a tube; a hollow filling mandrel extending into said tube and having a shaping portion of polygonal outline so that the tube follows such outline; first heat-sealing means for sealing the marginal portions of such sections of the tube which advance intermittently along and beyond said mandrel, said heat-sealing means comprising a heated sealing plate and means for reciprocating said sealing plate toward and away from said shaping portion; second heat-sealing means located past said mandrel and arranged to provide the leading ends of consecutively sealed sections with transverse flaps so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable materials through said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls.

20. An apparatus for making, filling and sealing containers from heat-sealable web material, comprising advancing means for intermittently advancing a continuous web lengthwise including a device for determining the length of intermittent advances of the web; folding means adjacent to the path of the web and arranged to overlap the marginal portions of the web so that the web forms a tube; a hollow filling mandrel extending into said tube and having a shaping portion of polygonal outline so that the tube follows such outline; first heat-sealing means for sealing the marginal portions of such sections of the tube which advance intermittently along and beyond said mandrel; second heat-sealing means located past said mandrel and arranged to provide the leading ends of consecutively sealed sections with transverse flaps so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable material through said mandrel so that each section receives such material prior to the formation of a flap at the trailing end thereof; and deforming means comprising an open-and-shut mold located past and cooperating with said second heat-sealing means to simultaneously deform the trailing end of a container reecived therein and the leading end of the nearest section and to thereby provide such containers and sections with polygonal end walls.

21. An apparatus as set forth in claim 20, wherein the means for determining the length of intermittent advances of the web comprises a fixed stop and a photoelectric cell.

22. An apparatus for making, filling and sealing containers from heat-sealable web material, comprising advancing means for intermittently advancing a continuous web lengthwise; first grooving means adjacent the path of the web and arranged to provide the web with a plurality of longitudinal fold lines; a sterilizing unit adjacent to the path of the thus grooved web and arranged to sterilize at least that side of the web which is to form the inner sides of the container; folding means adjacent to the path of the web and arranged to overlap the marginal portions of the web so that the web forms a tube which is composed of elongated strip-shaped portions folded upon each other; second grooving means for providing the tube with longitudinally spaced groups of transverse fold lines; a hollow filling mandrel extending into said tube downstream of said second grooving means and having a shaping portion of polygonal outline so that the tube follows such outline and the longitudinal fold lines are located at the corners of said shaping portion; first heat-sealing means for sealing the marginal portions of such sections of the tube which advance intermittently along and beyond said mandrel; second heat-sealing means located past said mandrel and arranged to provide the leading ends of consecutively sealed sections with transverse flaps between the transverse fold lines of successive groups so as to simultaneously close the adjacent ends of two consecutive sections measured quantities of flowable material container; measuring means for admitting into consecutive sections measured quantities of flowable material via said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls.

23. An apparatus as set forth in claim 22, wherein said sterilizing unit comprises a carriage including a wheel-mounted housing, a source of sterilizing liquid accommodated in said housing, and means for guiding the web through such sterilizing liquid so that both sides of the web are sterilized in a simultaneous operation.

24. An apparatus as set forth in claim 22, wherein said sterilizing unit comprises a source of sterilizing liquid and roller means arranged to transfer a layer of such sterilizing liquid from said source and to apply the layer continuously to one side of said web.

25. An apparatus as set forth in claim 22, wherein said sterilizing unit comprises a nozzle arranged to direct a spray of sterilizing fluid against one side of the web.

26. An apparatus as set forth in claim 22, wherein said sterilizing unit comprises a lamp arranged to direct ultraviolet rays against one side of the web at a point ahead of the point where the web forms a tube with overlapping marginal portions.

27. An apparatus as set forth in claim 22, wherein said sterilizing unit comprises a carriage including a wheel-mounted housing having a wall provided with a slot, a tank containing a supply of sterilizing liquid and accommodated in said housing, and roller means arranged to guide the web through said sterilizing liquid and thereupon through said slot, and further comprising a reel of convoluted web material accommodated in said housing and arranged to pay out the web in response to operation of said advancing means.

28. An apparatus as set forth in claim 22, wherein said sterilizing unit comprises a source of sterilizing liquid and a roller having a peripheral coat of liquid-accumulating material arranged to receive sterilizing liquid from said source and to apply such liquid to one side of the web.

29. An apparatus as set forth in claim 22, further comprising a wheel-mounted carriage, and a reel of convoluted web material supported by said carriage and arranged to pay out the web in response to operation of said advancing means, said sterilizing unit comprising a source of sterilizing liquid located intermediate said carriage and said folding means, and applicator means arranged to transfer a coat of sterilizing liquid from said source to one side of the web.

30. An apparatus as set forth in claim 22, further comprising a second sterilizing unit located past said first mentioned sterilizing unit and arranged to apply a coat of sterilizing liquid to said one side of the web at a point ahead of the point where the marginal portions of the tube overlap.

31. An apparatus for making, filling and sealing containers from heat-sealable web material, comprising advancing means for intermittently advancing a continuous web lengthwise; folding means adjacent to the path of the web and arranged to overlap the marginal portions of the web so that the web forms a tube; a hollow filling mandrel extending into said tube and having a shaping portion of polygonal outline so that the tube follows such outline; first heat-sealing means for sealing the marginal portions of such sections of the tube which advance intermittently along and beyond said mandrel; a tubular guide located past said mandrel and defining a passage each portion of which at least equals in cross section the outline of a container so that said sections can travel through said passage without undergoing deformation by said guide; second heat-sealing means located past said tubular guide and arranged to provide the leading ends of consecutively sealed sections with transverse flaps so as to simultaneously close the adjacent ends of two consecutive sections whereby the foremost section forms a sealed container; measuring means for admitting into consecutive sections measured quantities of flowable material via said mandrel so that each section receives such material prior to the formation of a flap at the trailing end thereof; and deforming means comprising an open-and-shut mold located past and cooperating with said second heat-sealing means to simultaneously deform the trailing end of a container received therein and the leading end of the nearest section and to thereby provide such containers and sections with polygonal end walls.

32. An apparatus for making, filling and sealing containers from heat-sealable web material comprising advancing means for intermittently advancing a continuous web lengthwise; folding means adjacent to the path of the web and arranged to overlap the marginal portions of the web so that the web forms a tube; a hollow filling mandrel extending into said tube and having a shaping portion of polygonal outline so that the tube follows such outline; first heat-sealing means for sealing the marginal portions of such sections of the tube which advance intermittently along and beyond said mandrel; a tubular guide located past said mandrel and defining a passage each portion of which at least equals in cross section the outline of a container so that said sections can travel through said passage without undergoing deformation by said guide; second heat-sealing means located past said guide and arranged to provide the leading ends of consecutively sealed sections with transverse flaps so as to simultaneously close the adjacent ends of two consecutive sections whereby the foremost section forms a container, said second heat-sealing means comprising a pair of sealing jaws reciprocable toward and away from each other in directions substantially at right angles to the longitudinal extension of the tube and means for moving said jaws toward each other and toward and away from said guide so that said jaws cooperate with said guide to deform the leading end of that section which is received in said guide; measuring means for admitting into consecutive sections measured quantities of flowable material via said mandrel so that each section receives such material prior to the formation of a flap at the trailing end thereof; and deforming means comprising an open-ended mold located past and cooperating with said second heat-sealing means to simultaneously deform the trailing end of a container received therein and the leading end of the nearest section to thereby provide such containers and sections with polygonal end walls.

33. An apparatus as set forth in claim 32, further comprising motion transmitting means arranged to couple said mold with said sealing jaws so that said mold moves toward said jaws to deform the trailing end of a container which is received therein when said jaws are moved toward said guide.

34. An apparatus as set forth in claim 32, wherein the means for moving said jaws comprises fluid-operated cylinders having reciprocable piston rods articulately connected with said jaws.

35. An apparatus as set forth in claim 32, further comprising fixed stop means arranged to limit the length of strokes of said jaws in a direction away from each other.

36. An apparatus as set forth in claim 32, wherein said mold comprises a pair of mold sections defining between themselves a mold cavity arranged to receive one container at a time, and means for reciprocating said mold sections toward and away from each other so that the mold cavity may receive a container when the mold sections are moved apart.

37. An apparatus as set forth in claim 36, wherein one of said mold sections is provided with knife means arranged to sever the flap at the leading end of that container which is received in said mold cavity when the mold sections are moved toward each other.

38. An apparatus as set forth in claim 36, wherein said mold cavity is completely closed when said mold sections are moved toward said sealing jaws, and further comprising arresting means for temporarily retaining said mold in closed condition.

39. An apparatus as set forth in claim 36, wherein said mold cavity is a parallelepiped shape so that a container received in said mold cavity in the closed position of said mold is automatically deformed to resemble a parallelepiped.

40. An apparatus as set forth in claim 36, wherein said mold sections comprise compressing jaws arranged to engage the flap at the leading end of that container which is received in said mold cavity.

41. An apparatus as set forth in claim 32, wherein each of said sealing jaws comprises at least one heating element and wherein said jaws are articulately supported by arms provided on said tubular guide.

42. An apparatus for making, filling and sealing containers from heat-sealable web material, comprising advancing means for intermittently advancing a continuous web lengthwise; folding means adjacent to the path of the web and arranged to overlap the marginal portions of the web so that the web forms a tube; a hollow filling mandrel extending into said tube and having a shaping portion of polygonal outline so that the tube follows such outline; first heat-sealing means for sealing the marginal portions of such sections of the tube which advance intermittently along and beyond said mandrel; second heat-sealing means located past said mandrel and arranged to provide the leading ends of consecutively sealed sections with transverse flaps so as to simultaneously close the adjacent ends of two consecutive sections whereby the foremost section forms a sealed container; means to impart to said second heat-sealing means an inward motion against the leading ends of consecutively sealed sections and a motion in a direction counter to the direction of intermittent advance of said sections; measuring means for admitting into consecutive sections measured quantities of flowable material via said mandrel so that each section receives such material prior to the formation of a flap at the trailing end thereof, said measuring means being adjacent to said tube at a point intermediate said mandrel and said second heat-sealing means; and deforming means comprising an open-and-shut mold located past and cooperating with said second heat-sealing means to simultaneously deform the trailing end of a container received therein and the leading end of the nearest section and to thereby provide such containers and sections with polygonal end walls.

43. An apparatus as set forth in claim 42, wherein said measuring means comprises a condenser of varable capacity.

44. An apparatus as set forth in claim 43, wherein said condenser comprises two plates disposed at the opposite sides of that section which is located just ahead of said second heat-sealing means.

(References on following page)

References Cited

UNITED STATES PATENTS

| | | | |
|---|---|---|---|
| 2,113,636 | 4/1938 | Vogt | 53—28 |
| 2,541,387 | 2/1951 | Salfisberg | 53—28 |
| 2,960,808 | 11/1960 | Pike | 53—28 |
| 2,994,998 | 8/1961 | Gwinn et al. | 53—182 |
| 3,006,121 | 10/1961 | Omori | 53—180 |
| 3,048,951 | 8/1962 | Oler | 53—28 |
| 3,082,583 | 3/1963 | Larson et al. | 53—182 |

FOREIGN PATENTS

| | | |
|---|---|---|
| 715,702 | 9/1954 | Great Brittain. |
| 827,792 | 2/1960 | Great Britain. |
| 920,923 | 3/1963 | Great Britain. |

TRAVIS S. McGEHEE, *Primary Examiner.*

FRANK E. BAILEY, *Examiner.*

N. ABRAMS, *Assistant Examiner.*